Oct. 6, 1970     G. F. BARTLETT     3,531,899

STRUCTURE FOR HOLDING FLEXIBLE COVERS

Filed Sept. 17, 1968     4 Sheets-Sheet 1

INVENTOR
GARY F. BARTLETT

*Finnegan, Henderson & Farabow*
ATTORNEYS

Oct. 6, 1970   G. F. BARTLETT   3,531,899
STRUCTURE FOR HOLDING FLEXIBLE COVERS
Filed Sept. 17, 1968   4 Sheets-Sheet 4

INVENTOR
GARY F. BARTLETT

Finnegan, Henderson & Farabow
ATTORNEYS

United States Patent Office 3,531,899
Patented Oct. 6, 1970

3,531,899
STRUCTURE FOR HOLDING FLEXIBLE COVERS
Gary F. Bartlett, Tanglewood, Muncy, Pa., assignor to Poly-Growers, Inc., Muncy, Pa., a corporation of Pennsylvania
Filed Sept. 17, 1968, Ser. No. 760,198
Int. Cl. E04b 7/08; E04d 5/06
U.S. Cl. 52—23                                10 Claims

ABSTRACT OF THE DISCLOSURE

A structure is provided for holding flexible covers to a frame which is particularly useful in constructing buildings such as greenhouses and the like. The structure includes a plurality of spaced frame members, a flexible cover extending over the frame members, and a plurality of clamping members positioned over the cover with one clamping member aligned with each frame member for clamping the flexible cover to the frame member. The clamping members each include at least one elongated resilient gripping member on its inner surface urging the cover firmly against the frame to provide a non-slip grip between the clamping member and the cover.

---

This invention relates to structures for holding flexible covers on frames and more particularly to framed structures used in the construction of buildings, such as greenhouses, and the like.

In recent years, new materials such as plastics, fiber glass, and the like have come to be used in the construction of structures such as greenhouses and the like in place of the traditional glass.

At first, plastic was simply stretched over wood frames and wooden slats were then placed on top of the plastic and nailed to the wooden frames. Such construction was found to be relatively expensive to maintain and required a large amount of time to assemble. Additionally, with this construction, it was difficult to eliminate wrinkles in the cover.

It was later found that the structures could be made by using a plurality of arched ribs having grooves in their upper surfaces. The plastic was then positioned over the ribs and was held in place by the use of cables or rods which were stressed at their ends to cause the cables and adjacent cover to be drawn into the groove in the upper surface of the ribs.

While this construction eliminated the need for nailing and also helped to stretch the flexible covering, it still was difficult and time-consuming to install, created stress on the flexible covering at the area where it entered the groove, and also was not readily adaptable for use with materials such as corrugated fiber glass.

It is therefore an object of this invention to provide a new and improved structure for holding flexible covers.

It is a further object of this invention to provide a new and improved anchor member for securing the bottom of the flexible cover member.

It is a further object of this invention to provide a new and improved joining member for joining the upper ends of a pair of frame members.

A still further object of this invention is to provide a new and improved greenhouse construction.

Additional objects and advantages of this invention wil be set forth in part in the description that follows and in part will be obvious from that description, or may be learned by practice of the invention, the objects and advantages being realized and attained by means of the instrumentalities, and combinations particularly pointed out in the appended claims.

To achieve the foregoing objects and in accordance with its purpose, the present invention comprises a structure including a plurality of spaced substantially parallel elongated frame members, a flexible cover extending over the outer surfaces of the frame members, a plurality of clamping members positioned over the cover with one clamping member aligned with each of the frame members for clamping the flexible cover to the frame members, and each of the clamping members includes at least one elongated gripping member projecting from the inner surface of the clamping member to urge the cover firmly against the frame member and to provide a non-slip grip between the clamping member and the cover, and biasing means connected to the clamping member to urge the gripping member against the cover and the frame member.

As used herein, the term "flexible cover" is intended to include covers which are not rigid but which may have varying degrees of flexibility such as plastic covers made of, for example, polyethylene or polyvinyl chloride, and fiber glass covers which may be corrugated.

Preferably, the frame members include first positioning means on their outer surfaces and the clamping members include second positioning means on their inner surface with the second positioning means matching the first positioning means to provide a positive one-position fit for the clamping members on the frame members.

It is also preferred that the frame members be curved or arched so that the structure formed by the frame members will take the cross-sectional shape of a half-circle.

In the preferred embodiment, the structure also includes an anchor means extending along at least one side of the structure with the anchor means including a longitudinally extending slot for receiving the flexible cover, and a securing means for holding the cover in the slot. The same anchor may be used to mount the frame members in their proper alignment and also to mount the clamping members and their biasing means.

It is also desirable that the frame members be made of a pair of matching arched segments joined at their upper ends by a longitudinal joining member extending along the top of the structure. The joining member preferably has abutting means on its upper surface for abutting the upper ends of the frame members. This same abutment means may be used to position the ends of the cover when corrugated fiber glass type covers are used.

Figure 1:
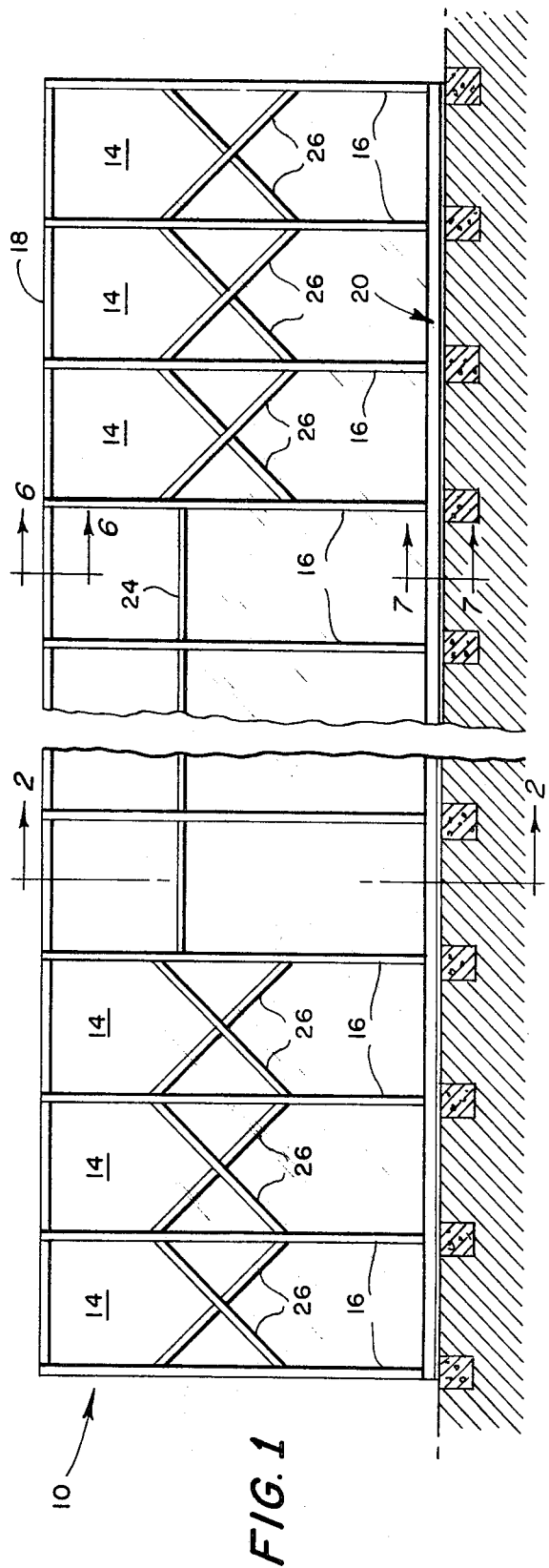
FIG. 1 is a side elevation partially broken away of a greenhouse constructed in accordance with the teachings of this invention.
Figure 2:
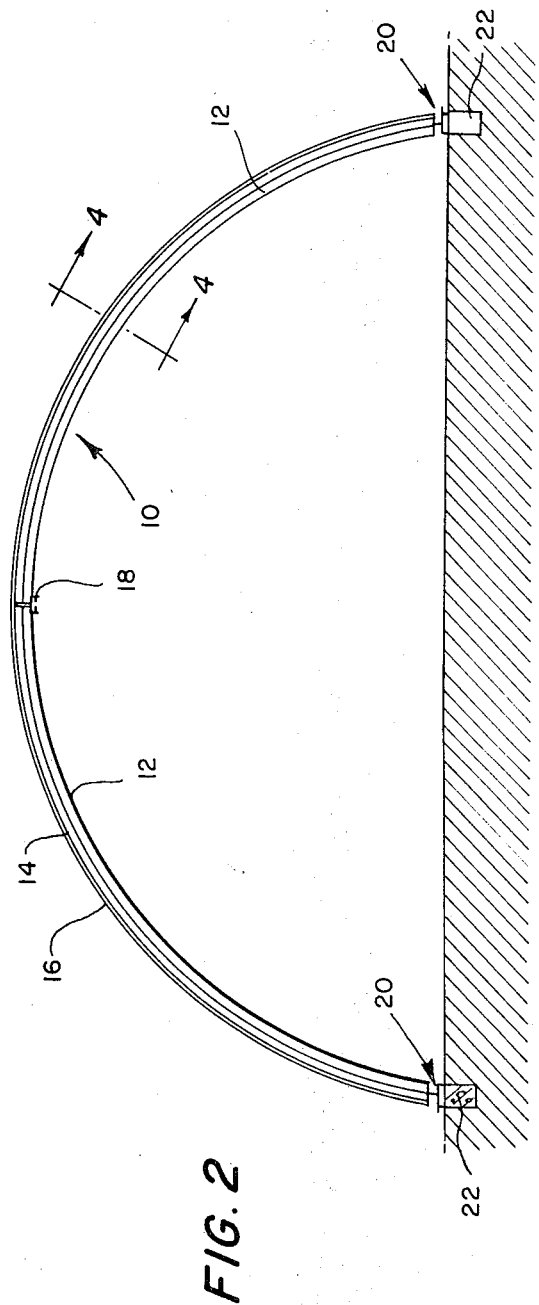
FIG. 2 is a schematic sectional view of the greenhouse of FIG. 1 taken along line 2—2 of FIG. 1.

Referring now to FIGS. 1 and 2 of the drawings, it may be seen that a structure, generally 10, is provided in the form of a greenhouse.

For purposes of illustration, the invention will be described in conjunction with its use in the construction of a greenhouse. However, it is not intended that the use of this invention be limited to greenhouses. The advantages of the invention can be obtained with various structures and buildings which use flexible covers.

As may be seen in FIGS. 1 and 2, the greenhouse includes a plurality of spaced arched, substantially parallel, elongated, frame members or ribs 12 covered with a flexible cover 14 extending over the entire outer surface of the frame members. As here illustrated, the flexible cover is a plastic sheet made of polyethylene.

A plurality of clamping members or straps 16 are positioned over cover 14 with one clamping member 16 aligned with each of frame members 12 for clamping cover 14 to the frame members. A joining member 18 extends along the top of the greenhouse and joins arched ribs 12 at their upper ends. An anchor member 20 extends along the base of the greenhouse on each side. The anchor member 20 may be held in position by any conventional means, such as being bolted to cement footings 22 spaced along the length of the greenhouse.

As here illustrated, ribs 12 are held in alignment by longitudinal braces 24 and crossed braces 26. If desired, the braces may be eliminated with the ribs being held in alignment by the anchor member alone.

Figure 3:
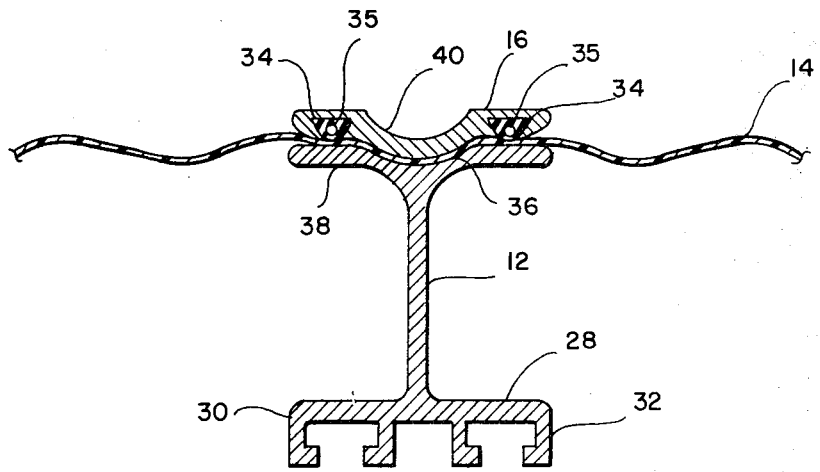
FIG. 3 is a sectional view illustrating one embodiment of the frame member and clamping member of this invention used with a corrugated fiber glass cover.
Figure 4:
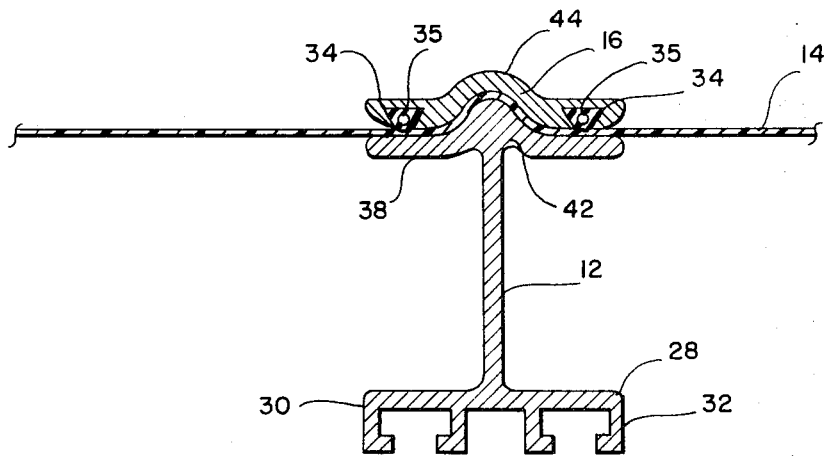
FIG. 4 is a sectional view taken along line 4—4 of FIG. 2 and illustrates another embodiment of the frame member and clamping member of this invention used with a plastic cover.

Referring now to the rib and clamping member assemblies illustrated in FIGS. 3 and 4, it may be seen that clamping member 16 is positioned over frame member 12 with the flexible cover 14 positioned between the clamping member and the frame member 12. Frame member 12 is of a generally I cross-section. The base 28 of the I preferably contains channels 30 and 32 which may be used to secure the frame member to an anchor joining member or other support.

In accordance with the invention each of the clamping members includes at least one elongated resilient gripping member projecting from the inner surface of the clamping member to urge the cover firmly against the frame member and provide a positive continuous seal and a non-slip grip between the clamping member and the cover.

As here embodied, the clamping member 16 of both FIGS. 3 and 4 contain two parallel elongated resilient gripping members 34. Gripping members 34 may be made of any suitable material but preferably are made of neoprene which has sufficient flexibility to follow the contour of the straps 16 and is resilient. As here embodied, each of the elongated gripping members 34 includes an internal longitudinal opening 35 which acts to give greater resiliency to the neoprene gripping member. The parallel gripping members, in addition to gripping the cover, also act as an effective seal to prevent water, ice, and foreign matter from working their way in between the strap and the cover.

In accordance with the preferred embodiment of the invention, a first positioning means is provided on the outer surface of the frame members and a second positioning means is provided on the inner surface of the clamping members with the second positioning means matching the first positioning means to provide a positive one-position fit for the clamping members on the frame members.

In the embodiment illustrated in FIG. 3, a groove 36 on the upper surface 38 of rib 12 acts as the first positioning means and a ridge 40 on the lower surface of clamping member 16 acts as a second positioning means. The contours of groove 36 and ridge 40 are such that the two surfaces match with ridge 40 fitting within groove 36 with cover member 14 positioned therebetween.

As embodied in FIG. 4, the upper surface 38 of rib 12 contains a ridge 42 which acts as the first positioning means and clamping member 16 contains a groove 44 on its inner surface which acts as the second positioning means. Here again, the contours of ridge 42 and groove 44 are matched with ridge 42 fitting in the groove 44 with cover member 14 positioned therebetween. It should be noted that the two surfaces can match without being of identical contour as long as the two surfaces cooperate to provide a one-position fit for the clamping members on the frame members.

The flexible cover illustrated in FIG. 3 is a corrugated fiber glass and the flexible cover illustrated in FIG. 4 is a polyethylene sheet.

It will be readily apparent to those skilled in the art that either type of cover may be used with either embodiment. Preferably, when a corrugated material is used the corrugations are designed to follow the contour of the matching surfaces of the strap and rib members.

Figure 5:
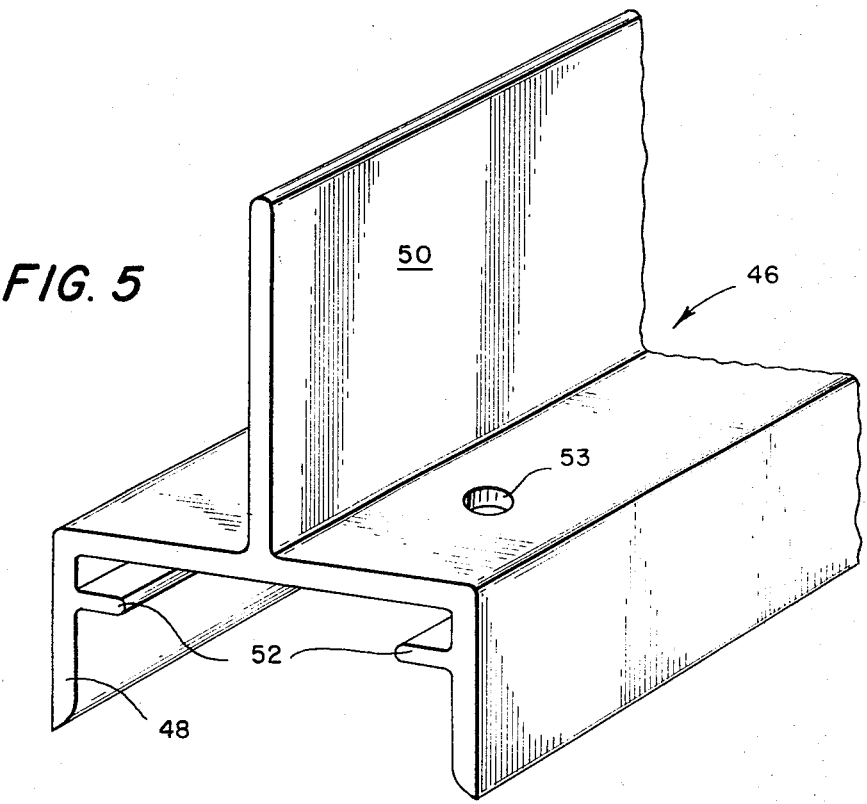
FIG. 5 is a perspective view of the joining member of this invention.
Figure 6:
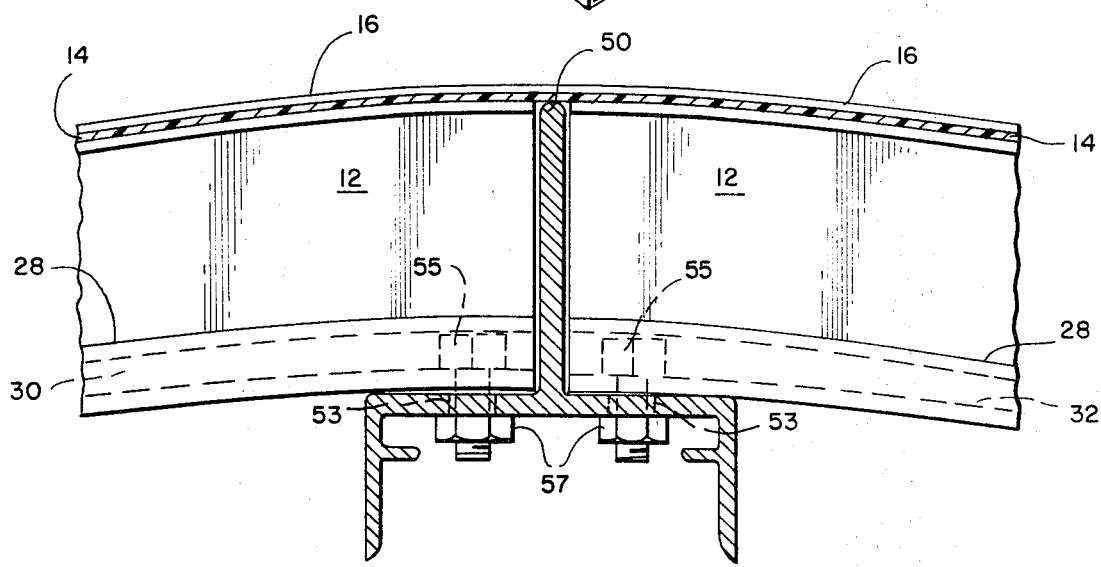
FIG. 6 is a sectional view taken along line 6—6 of FIG. 1 and illustrates the joining member in position between two adjacent frame members.

In accordance with a presently preferred embodiment of the invention the frame members are each made of two arched segments joined at their upper ends by longitudinal joining member 46 extending along the top of the structure. As herein embodied and as illustrated in FIGS. 5 and 6, the longitudinal joining member, generally 46, is comprised of a channel section 48 and an upright flange 50. A pair of ridges 52 are formed internally of channel 48 and are spaced a short distance below the inside of the top of channel 48. Ridges 52 extend the entire length of channel 48 and are used, as will be described in more detail hereinafter, for attaching successive joining members together. Holes 53 are provided in the top of channel 48 for receiving bolts 55 which are used to secure frame members 12 to joining member 46. Preferably the holes are positioned at appropriate points along the length of channel 48 so that they match the positions of frame members 12. At each position, two holes are provided on each side of flange 50, one for each channel in frame member 12. As may be best seen in FIG. 6, bolts 55 fit in channels 30 and 32 of frame members 12, pass through holes 53 in channel 48, and are secured by nuts 57 on the inner surface of the top of channel 48.

Preferably, the height of flange 50 is such that flexible cover 14 and clamping member 16 can pass over top of the flange without interference therefrom. When the structure illustrated in FIG. 3 is used, the groove 36 in rib 12 requires that a groove be cut in the flange so that the upper surface of the flange will not interfere with the flexible cover member or the clamping member.

Corrugated fiber glass is not presently available in continuous sheets large enough to cover an entire greenhouse. Thus, when corrugated fiber glass is used as the flexible cover, it is necessary to use a plurality of segments rather than the continuous sheet and flange 50 helps to keep the fiber glass in alignment along the top of the greenhouse.

In accordance with the invention, a new and improved anchor member is also provided for firmly gripping and holding the extremely flexible plastic sheet type cover such as polyethylene.

Figures 7, 8:
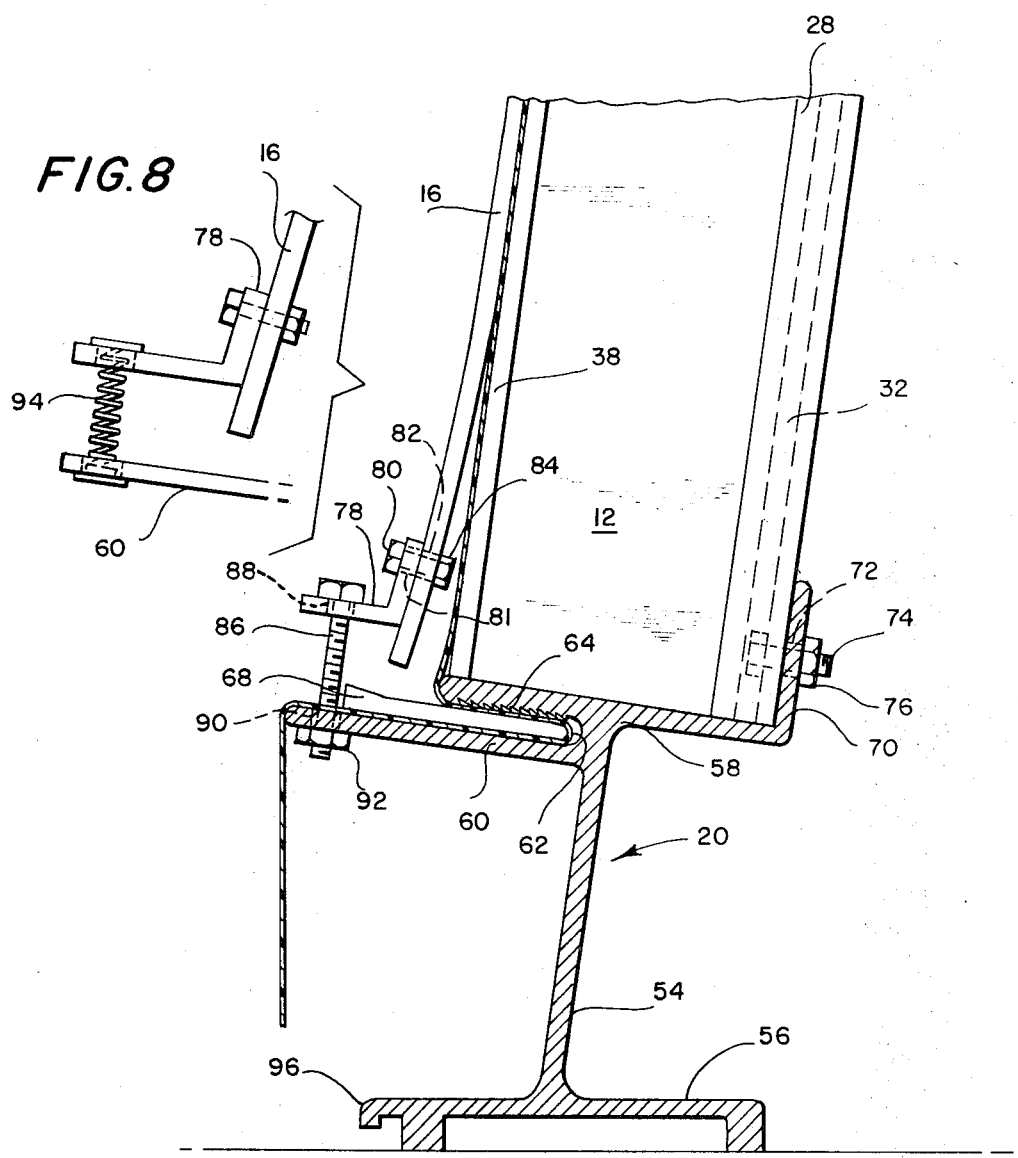
FIG. 7 is a side elevation partially in section taken along line 7—7 of FIG. 1 illustrating the anchor member constructed in accordance with the teachings of this invention.
FIG. 8 is a fragmented view illustrating an alternative embodiment of the biasing means.

Referring to FIG. 7, a preferred embodiment of the anchor member may be seen in which the anchor member also includes means for mounting frame member 12 and clamping member 16. As seen in FIG. 1, anchor means 20 extends along the entire length of the greenhouse and as seen in FIG. 2, preferably one anchor is mounted on each side of the greenhouse.

Referring again to FEB. 7, it may be seen that anchor 20 is composed of a web portion 54, a base 56, and a top 58. A flange 60 extends substantially parallel with top 58 a short distance below top 58 to provide a slot 62 for receiving flexible cover 14. As here embodied, the lower surface of top 58 has serrations 64 for gripping sheet 14 in the slot. A wedge 68, which is preferably continuous and extends along the entire length of anchor 20, is forced into slot 62 to firmly hold the flexible cover. Wedge 68 may be made of any suitable material but is preferably made of neoprene.

In this embodiment, anchor 20 also anchors rib 12. A flange 70, which is perpendicular to top 58, extends along the length of the inside of anchor 20. Flange 70 contains pairs of holes 72 provided along its length in alignment with ribs 12. Bolts 74, the heads of which extend into channels 30 and 32 of ribs 12, extend through holes 72 and are secured by nuts 76.

In accordance with the invention, biasing means are connected to the clamping means to cause the clamping member to urge the gripping member against the cover and the frame member. The biasing means acts to firmly position the clamping member on the frame member and apply pressure to the gripping member. As embodied in FIG. 7, the biasing means includes a bracket 78 which is bolted to the end of clamping member 16 by a bolt 80 which passes through a hole 81 in bracket 78, a hole 82 in clamping member 16, and is secured by a nut 84.

The biasing means also includes a second bolt 86 passing through a second hole 88 in bracket 78. Bolt 86 then passes through a hole 90 in flange 60 and is secured to flange 60 by a nut 92. The tightening of nut 92 creates the desired tension in strap 16 by tending to pull bracket 78 and hence the end of strap 16 towards flange 60. Preferably, bracket 78 is positioned a sufficient distance away from flange 60 to permit nut 92 to be adjusted to the desired tension. Although only one strap is shown here, a biasing means is preferably attached to each strap on each side of the greenhouse. Thus, each of the straps can be placed in tension by tightening nut 92 on the ends of the strap.

During the course of a year greenhouses in many sections of the country are subjected to varying temperatures. In the North, for example, during the winter months, the temperatures can be quite cold and during the summer months, the temperatures can be quite hot. This change in temperature will sometimes produce changes in the length of straps 16, which can change the amount of tension being applied through the biasing means. Thus, biasing means which are properly adjusted during the winter months or early spring may become too loose during the summer months.

This condition can be readily remedied by simply tightening the biasing means in the summer months. However, if it is desired, one of the biasing means may include a strong spring as is illustrated in FIG. 8.

In the biasing means of FIG. 8, one end of bracket 78 is again connected to strap 16. The other end of bracket 78 is connected to a spring 94 which in turn is connected to flange 60 of anchor 20. By using a spring biasing means on one end of straps 16 and a bolt type biasing means on the other end of the straps, the straps may be assembled at any time of the year with the proper tension being placed on the straps by the bolt biasing means. The springs can then absorb any changes in length in the straps which occur through changes in temperatures. Thus, the straps will always be at the proper tension.

The joint between flange 70 and top 58 of anchor member 20 forms a gutter area which permits moisture which has condensed on the inside of cover 14 to be carried away to the ends of the anchor member rather than dripping into the interior of the greenhouse itself. The web portion 54 of anchor 20 is preferably canted at an angle of about 82° from base 56 to provide the proper slope for receiving ribs 12 which are arcuate in shape. The base 56 of anchor 20 has a lip 96 which may be used in locking the anchor 20 on a sill or the like if it is desired to have a sill surrounding the greenhouse.

The assembly of the greenhouse is accomplished by first mounting anchor members 20 along the two sides of the area to be encompassed by the greenhouse. Next, ribs 12 are positioned on the top 58 of anchor members 20 with the heads of bolts 74 positioned in channels 30 and 32 of ribs 12. Nuts 76 are then tightened to firmly hold the ribs in place. When a pair of facing ribs have been mounted on their respective anchor members they are joined to a joining member 46 as illustrated in FIG. 6. The ribs are secured to the joining member by simply sliding the heads of bolts 55 into channels 30 and 32 of ribs 12 and tightening nuts 57.

If desired, a single joining member 46 may be used which extends the entire length of the structure. However, it may be convenient to use joining members of shorter lengths with the joining members being attached together at appropriate places. This attachment may be accomplished conveniently by sliding a flat metal plate into the slots formed between the ridges 52 and the top of channel 48 with a single plate extending into the slots in two adjacent joining members. The joining members may be then brought into abutting relationship and the plates can be bolted to the joining members.

After the desired number of ribs 12 have been mounted on the joining members 46, the flexible cover is placed over the top surface of ribs 12. Where the cover is in a form of a plastic sheet or the like, it is simply stretched over the top of the ribs with the ends hanging over the outside edges of anchors 20 on either side of the structure. Next, the longitudinal wedge member 68 is forced into slot 62 to stretch the cover tightly over the rib members. Wedge 68 may be one continuous piece or may be made in sections for convenience in handling. When the wedge is in sections, it is preferred that the individual wedges be placed closely together to provide a continuous seal along the sides of the greenhouse with the wedge coacting with the serrations 64 in slot 62 to firmly hold the cover member in position.

Next the straps 16 are placed in position over ribs 12 with one strap positioned over each pair of ribs. Preferably, the straps 16 are made of aluminum and are flexible. Thus the straps can be easily picked up by two assemblers who then simply flex the strap into a semicircular shape. They then walk on opposite sides of the structure to a pair of ribs 12 and place the strap 16 over the ribs. Peferably, the ends of the straps 16 will already have brackets 78 affixed thereto by bolts 80 and nuts 84. If it is desired to use a spring on one end of the hoop, the spring may then be attached between bracket 78 and flange 60 of anchor 20 on one end, and a bolt 86 may be inserted through the hole 88 in flange 70 on the other end. One end of bolt 86 is then inserted through hole 90 in flange 60 of anchor member 20 and nut 92 is tightened to provide the desired tension on the clamping members 16. This operation is repeated until all of the straps are in position. If it is desired, the ends of the greenhouse may then be closed in any conventional manner.

The construction of the greenhouse utilizing corrugated fiberglass rather than a plastic sheet type cover is similar to that described except that the fiberglass sections are simply laid over the ribs and then held in position by straps 16. With fiber glass, of course, it is not necessary to secure the cover to anchor member 20 with a wedge.

The anchor members, frame members, and the body of the clamping members may be constructed of any suitable material, but are preferably constructed of extruded aluminum alloys.

In accordance with the invention a new and improved structure has been provided for use in attaching flexible covers to frame members. The structure may be particularly advantageously used in the construction of buildings such as greenhouses and the like. The construction provides a system which may be easily assembled, which positively locates the position of the clamping member on the frame, which eliminates wear points which can provide physical damage to the cover, which is neat in appearance, and which is relatively maintenance-free.

The invention in its broader aspects is not limited to the specific details shown and described without departing from the principles of the invention and without sacrificing its chief advantages.

What is claimed is:
1. A structure comprising:
What is claimed is:
(a) a plurality of spaced substantially parallel elongated members spanning an area,
(b) a flexible cover extending over the outer surfaces of said frame members;

(c) a plurality of clamping members positioned over said cover with one clamping member aligned with each of said frame members clamping said flexible cover to said frame members;

(d) each of said clamping members including at least one elongated resilient gripping member projecting from the inner surface of said clamping member to urge said cover firmly against said frame member to provide a non-slip grip between said clamping member and said cover;

(e) anchor means extending along each side of the structure, at least one of said anchor means including a horizontally extending slot receiving said flexible cover, and securing means holding said cover in said slot, said clamping members terminating above said slot to permit said flexible cover to form a continuous seal along said slot; and (f) biasing means connecting said anchor means and said clamping members and causing said clamping members to urge said gripping member against said cover and said frame member, said biasing means including a bracket attached to each clamping member, a bolt interconnecting said bracket and said anchor means, and a nut on said bolt pulling said bracket and said clamping means toward said anchor means.

2. The structure of claim 1 including first positioning means on the outer surface of each of said frame members and second positioning means on the inner surface of each of said clamping members with said second positioning means matching said first positioning means to provide a positive one-position fit for said clamping members on said frame members.

3. The structure of claim 2 wherein said first means is a projection on the outer surface of said frame member and said second means is a groove on the inner surface of said clamping member, said groove having a shape matching the shape of said projection to provide a positive one-position fit for said clamping means on said frame member and for tightening said cover on said structure between adjacent frame member by causing said cover to follow the contour of said projection.

4. The structure of claim 2 wherein first means is a groove on the outer surface of said frame member and said second means is a projection on the inner surface of said clamping member, said projection having a shape matching the shape of said groove to provide a positive one-position fit for said clamping means on said frame member and for tightening said cover on said structure between adjacent frame member by causing said cover to follow the countour of said projection.

5. The structure of claim 2 wherein each of said clamping members includes two elongated resilient gripping member with one gripping member positioned on each side of said second positioning means.

6. The structure of claim 5 wherein said gripping members are made of neoprene.

7. The structure of claim 1 wherein said frame members are mounted on said anchor means.

8. The structure of claim 1 wherein said securing means is a flexible wedge extending the length of said slot.

9. The structure of claim 1 wherein said frame members are made of a pair of matching curved segments joined at their upper ends at a longitudinal joining member extending along the top of the structure.

10. The structure of claim 9 wherein said joining member includes abutment means on its upper surface for aligning said frame members.

References Cited

UNITED STATES PATENTS

| | | | |
|---|---|---|---|
| 1,560,114 | 11/1925 | Skog | 135—3 |
| 1,796,581 | 3/1931 | Siebenlist | 160—380 |
| 2,353,071 | 7/1944 | Pitou | 52—86 |
| 2,842,073 | 7/1958 | Huston | 52—395 |
| 2,914,776 | 12/1959 | Hotz | 52—23 |
| 3,058,518 | 10/1962 | Housman | 160—380 |
| 3,080,875 | 3/1963 | Bartlett | 135—3 |
| 3,424,179 | 1/1969 | Minot | 52—63 |

HENRY C. SUTHERLAND, Primary Examiner

U.S. Cl. X.R.

52—86, 222, 469; 135—1